INVENTORS
Robert D. Kodis &
Sadia S. Guterman
BY Morse & Altman
ATTORNEYS

March 2, 1965
R. D. KODIS ET AL
3,171,349
OUTPUT CIRCUIT FOR MAGNETIC CORE MEMORY
IN A HIGH SPEED PRINTER
Filed Dec. 13, 1961
2 Sheets-Sheet 2

INVENTORS
Robert D. Kodis &
Sadia S. Guterman
BY
Morse & Altman

United States Patent Office
3,171,349
Patented Mar. 2, 1965

3,171,349

OUTPUT CIRCUIT FOR MAGNETIC CORE MEMORY IN A HIGH SPEED PRINTER

Robert D. Kodis, Brookline, and Sadia S. Guterman, Dorchester, Mass., assignors to Di-An Controls, Inc., Boston, Mass., a corporation of Massachusetts Filed Dec. 13, 1961, Ser. No. 159,074
4 Claims. (Cl. 101—93)

The present invention relates to magnetic core memory systems and, more particularly, to memory systems of the type comprising a plurality of bistable magnetic cores, each of which is capable of assuming a first flux direction representing a ZERO and a second flux direction representing a ONE. Commonly, it is desired to write information into such a memory in serial and to read information from such a memory in parallel. Or, it is desired to write information into such a memory in parallel and to read information from such a memory in serial. For example, it may be desired to write information into such a memory in serial from a computing system or a primary storage but to read this information from the memory in parallel for the purpose of actuating a high speed punch, a sorter control unit, a rotary printer or a like output mechanism. The transition from serial input to parallel output or from parallel input to serial output is called "corner turning." The present invention contemplates a device of the foregoing type in which corner-turning is effected in an unprecedentedly simple yet thoroughly effective manner.

A so called coincident current memory of the type comprises rows and columns of cores, of which the individual rows are provided with individual so-called X drive lines and the individual columns are provided with inividual so-calle Y drive lines'. A so-called half amplitude pulse on any single drive line is incapable of reversing the flux of any core in association therewith but coincident half amplitude pulses of appropriate polarity on selected X and Y drive lines are capable of reversing the flux on the core at their intersection. Also provided are an inhibit line of suitable polarity and a sense line in association with all cores. A pulse on the inhibit line, in coincidence with half amplitude drive pulses of suitable polarity on selected X and Y drive lines, prevents a flux reversal from occuring in the core at their intersection. And coincident half amplitude pulses of suitable polarity on selected X and Y drive lines are capable of producing a flux reversal in the core at their intersection in order to generate a pulse in the sense line. Thus, if initially all cores are reset to ZERO: coincident half amplitude pulses on selected X and Y drive lines will write a ONE into the core at their intersection; coincident half amplitude pulses on selected X and Y drive lines and on the inhibit line will write a ZERO (maintain a ZERO) into the core at their intersection; and the ZERO or ONE state of any core may be determined by whether or not coincident pulses on the X and Y drive lines intersecting at that core produce a change of flux that is detected through the sense line.

The most economical arrangement for programming the introduction of information into or removal of information from such a core memory is merely by pulsing the X and Y drive lines in a simple sequence. A high speed output component of one type useful in conjunction with a core memory of the foregoing type is a so-called rotary bar printing mechanism including, for example, a continuously rotating drum presenting a plurality of columns of characters extending peripherally thereabound and arranged in rows extending longitudinally thereacross. Ordinarily, the characters of any column are sequentially different and the characters of any row are identical. In association with the drum is a row of hammers. Between the hammers and the drum is an intermittently advancing sheet of paper and an ink impregnated medium by which a character is imprinted on the paper when a hammer is actuated. The imprint of any character in a particular row on the paper is produced by the actuation of a particular hammer at a particular moment during the period of rotation of the drum. In such a printing mechanism, economical use of time dictates that a complete row of characters be printed during a single rotation of the print drum. Toward this end, when a particular row of like characters is momentarily in print position, all selected hammers to be actuated during the single rotation in question are actuated at once. Similarly, when the next row of like characters is momentarily in print position, all selected hammers to be actuated during the single rotation are actuated at once, etc. In the foregoing manner, the bits of a character that are loaded serially into the various memory planes are unloaded in parallel to actuate the print mechnism.

In corner-turning between a core memory and a printing mechanism of the aforementioned types, it has been proposed to use a two-way shift register capable of shifting in information in sequence and shifting out information in parallel. Thus, in a system of twelve shift registers of eightly positions each, twelve bits at a time may be written into the system and eighty bits at a time may be read from the system. However, such shift register systems are characterized by unduly costly multiplication of components. The illustrated embodiment of the present invention, by way of example, contemplates a "corner turner" for effecting serial input and parallel output to a print mechanism for the foregoing purposes in an unusually simple and inexpensive manner.

The object of the present invention is to effect corner turning between a memory and a printer of the foregoing types by taking advantage of the orders of magnitude of the difference between their speeds. Typically, the operation of the memory is measured in terms of microseconds whereas the operation of a printer is measured in terms of milliseconds. In accordance with the present invention, the core memory is scanned in whole or in part during each incremental part of the cycle of operation of the printer.

Thus, for example, in the case of a rotary bar printer, for each incremental rotational position of the print drum, i.e. each time a row of like characters moves into print position, the entire core memory is scanned in order to select from the core memory coded designations of hammers to be actuated. In other words, assuming a core memory comprising six core planes of 77 cores each, the core memory is capable of serially receiving 77 characters of six bits each. Each of the characters, in terms of its six bit code in the corresponding cores of the six core planes, represents a selected character of the print wheel, which includes at its periphery rows of 77 like characters and 77 columns of successively different characters. When the row including this character is moved to print position, the entire memory is scanned, in consequence of which the hammer associated with the selected character is actuated.

Other objects of the present invention will in part be obvious and will in part appear hereinafter.

For a fuller understanding of the nature and objects of the present invention, reference should be had to the following detailed description, taken in connection with the accompanying drawings wherein.

General Description

Figure 1:
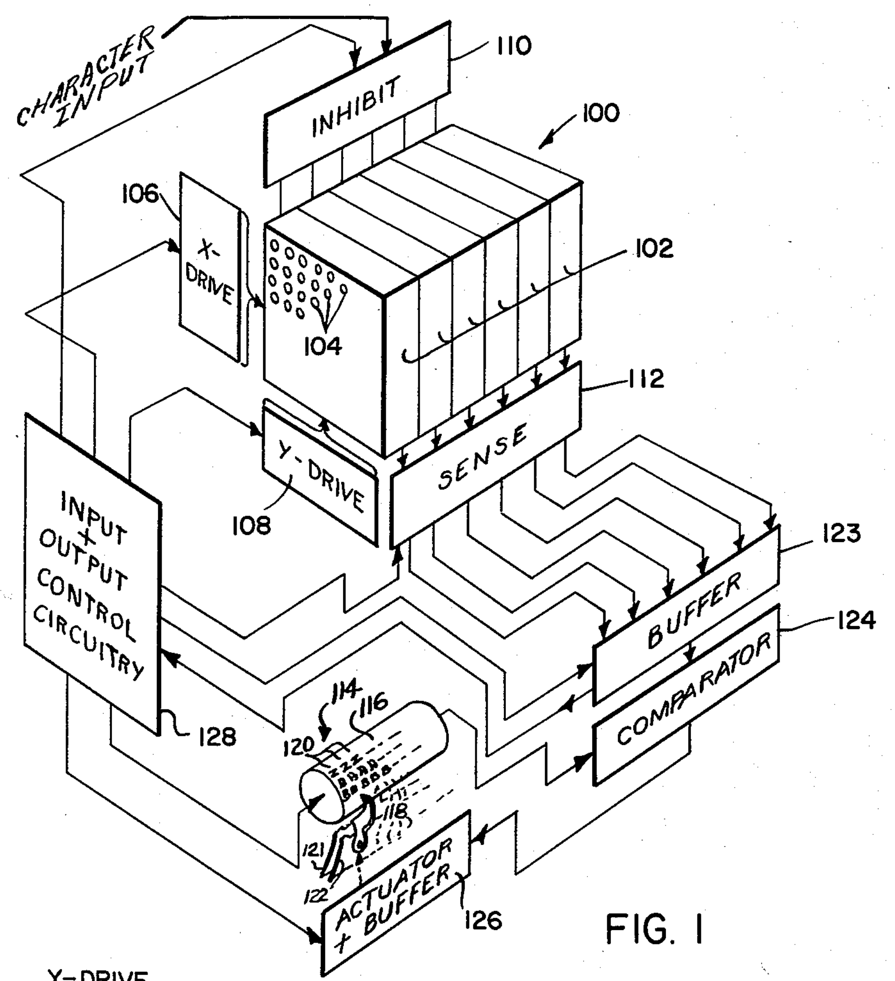
FIG. 1 is a perspective diagrammatic view of a system embodying the present invention.
Figure 2:
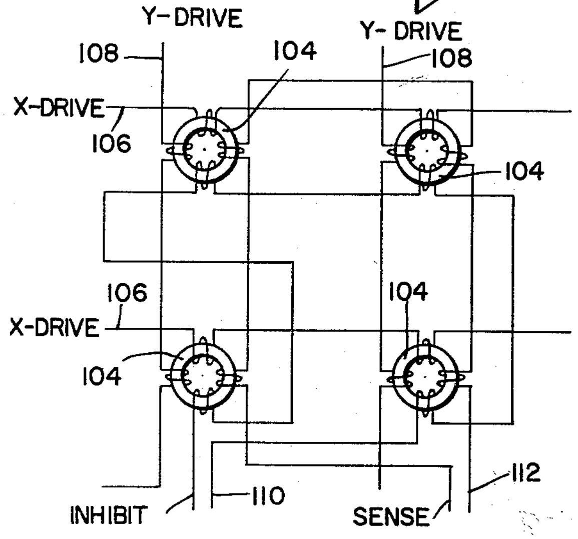
FIG. 2 illustrates electromagnetic details of a part of the system of FIG. 1.

Generally, the system of FIG. 1 illustrated as embodying the present invention, comprises a stack 100 of six core frames 102 each having eleven cores in a row and seven cores in a column, the cores being designated 104. As is shown in FIG. 2, each of cores 104 is in the form of a magnetic toroid. Individual rows of cores are provided with individual X drive lines and individual columns of cores are provided with individual Y drive lines 108. Similarly positioned X drive lines of sequence of digit planes or frames 102 are serially connected and similarly positioned Y drive lines of sequence of frames 102 are serially connected. Also provided are a single inhibit line 110 and a single sense line 112 in association with all of the cores of a single frame. The arrangement is such that: the bits of a character are written into similarly positioned cores of sequence of frames 102 under the control of selected X and Y drive lines, associated with all of the frames, and individual inhibit lines, associated with individual frames; and these bits are read from similarly positioned cores of sequence of frames 102 under the control of selected X and Y drive lines, associated with all of the frames, and individual sense lines, associated with individual frames.

The rotary bar printer illustrated at 114 comprises a rotary drum 116 and a row of hammers 118 disposed along a line at the periphery of drum 116 parallel to its axis. Drum 116 presents 77 columns 120 circularly disposed along its axis in sequence. All of the columns 120 are identical in their character sequence so that the characters of any column sequentially vary from position to position and the characters of any row all are identical to each other. Disposed between print drum 116 and hammers 118 is an ink impregnated strip 121 and a strip 122 of paper, which may be advanced intermittently by a suitable intermittent drive (not shown). Hammers 118, which are 77 in number, are disposed to strike particular positions on drum 116 when actuated by suitable signals. Printer 114 for example, is of the type disclosed in Patent No. 2,692,551 issued October 26, 1954, Patent No. 2,978,977 issued April 11, 1961 or Patent No. 2,989,987 issued June 20, 1961.

In accordance with the present invention, for each time a selected row of characters commanded to be scanned by previous print time arrives in print position in alignment with hammers 118, the entire memory 100 is scanned. A buffer 123 stores the resulting coded characters one-at-a-time. A comparator 124 serves to compare the resulting signals with reference signals corresponding to the rotational position of drum 116. An actuator 126 causes selected hammers 118 to strike drum 116 whenever coincidence occurs. The foregoing components, together with input and output control circuitry 128, in general, perform the functions to be described now. Details of the control circuitry will be described later in reference to FIG. 3. The illustrated system is designed for operation in two modes—the loading mode and the printing mode. In the loading mode, the system is designed to accept 72 six bit characters (rather than the 77 described above for clarity) serially presented and to hold these in storage until they are to be processed to print a line. In the printing mode, all of one like character are read at the same time in parallel. When a complete line has been printed, the system either may be ordered to print the same line a second time or to accept and process new information. Typically, the characters can be loaded at any externally controlled rate up to 100,000 per second. Characters, for example, may be presented to the system as six voltage levels on six lines. The characters are stored in successive address locations of the memory upon the application of an external load synch pulse (LSP). When 72 characters have been loaded, the system provides an output signal, which signifies that the storage is full and also automatically places the system in the printing mode. The equipment is then dormant until a print start pulse is applied. Reception of this command, which is synchronous with the print character pulses obtained from the printer mechanism, causes the system to scan through all the 72 addresses and to determine which of them contain the characters to be printed at the next print drum printing position. Succeeding print character pulses perform two tasks. First they energize output amplifiers to print the columns corresponding to those addresses in which characters to be printed were found on the previous scan; and second, they start a new memory scan to discover which memory addresses contain the next character to be printed. Typically, the minimum time required to load the memory is 10 microseconds per character.

There are two printing modes. The first is an "all character codes" mode. The second is a "restricted character codes" mode. Either can be selected by an external command at the time of reception of a print start pulse (PSP). In the all codes mode, the memory is scanned as many times as there are characters on the print drum. In the restricted codes mode, the number of memory scans is equal to the limited number of character codes to be printed. There is a requirement that this group of character codes must start with a known character code. this can be the first or any other character part. This can be in the order of the location of the corresponding characters on the print drum. Typically, the time required to scan the memory for each print drum revolution position is less than 800 microseconds. Unloading of the memory during scanning is non-destructive. Hence the printing of a line may be repeated by the application of an additional print start pulse after the occurrence of a print finished pulse (PFP).

The input signals to the illustrated system include a load synch pulse (LSP), a character load synch (CLS), a character code input (CCI), a column skip input (CSI), a print start pulse (PSP), a print character pulse (PCP), and a print drum revolution pulse (PDRP). The terminals at which these pulses are applied are designated in FIG. 3 by the initials within the foregoing parentheses.

The load synch pulse sets the memory to the loading mode and thus enables it to accept data for storage. Typically, the characteristics of this pulse are as follows:

Amplitude: −5 to −9 volts into 500 ohms
Reference: ground
Rise time: 1 microsecond maximum
Duration: 2 to 10 microseconds measured at 90% peak amplitude One character load synch pulse is to be provided for each character loaded into the storage. The first such pulse may arrive typically not less than 10 microseconds after the end of the load synch pulse and succeding character load synch pulses must maintain a minimum spacing of 10 microseconds. All 72 addresses must be loaded before the print start pulse as described below, can be applied. Typically, the characteristic of a character load synch pulse are as follows:

Amplitude: −5 to −9 volts into 500 ohms
Reference: ground
Rise time: ½ microsecond, maximum
Duration: 2 microseconds ±10% measured at 90% peak amplitudes The character code inputs are six bits applied in parallel on six lines with ground as reference. Typically, the characteristics of these signals are as follows:

ONE signal: −6 to −9 volts
ZERO signal: +6 to −.5 volts
Impedance: 1500 ohms
Duration: Signal must be present and constant 3 microseconds after the leading edge of the character load synch pulse, and hold constant for 6 microseconds thereafter.

The column skip input pulse is generated by the arrival of a character load synch pulse plus the application of a ONE signal. In consequence, the memory is loaded with the character code 111111 irrespective of the signals on the 6 character code input lines. If this character code is set as invalid, the corresponding column will not be printed. The characteristics of this signal are the same as those of the character code input signals.

Selection of a full or a restricted printing mode typically is accomplished by providing the signals below on two printing mode selection lines:

| | Line A, volts | Line B, volts |
|---|---|---|
| All codes | +6 to −.25 | −5 to −9 |
| Restricted codes | −5 to −9 | +6 to −.25 |

These signals must be present when the print start pulse is initiated. As indicated above, full printing cycle is defined as the condition in which the memory is scanned as many times as there are characters on the print drum, any of which may be printed. Restricted printing cycle is defined as the condition in which a specified limited number of memory scans are made to generate the outputs of a group of specified characters only.

The print start pulse causes a line to be printed in accordance with the information loaded in the memory. It must not occur during the period starting with the arrival of the load synch pulse and ending with the emission of the storage full signal. If the print start pulse is connected so as to activate the first memory scan it must be in synchronism with one of the print character pulses. The characteristics of the print start pulse are the same as those of the character load synch. One print character pulse is provided for each character on the print drum, with a typical minimum interval of 800 microseconds. The characteristics of the print character pulse are the same as those of the character load synch. One print drum revolution synch pulse is provided for each revolution of the print drum and occurs one print character before the character corresponding to coded character 000000. The characteristics of this pulse typically are as follows:

Amplitude: −5 to −9 volts into 1K ohm
Reference: ground
Rise time: 2 microseconds, maximum
Duration: 2 to 50 microseconds measured at 90% amplitude The output signals of the illustrated systems include a character stored pulse (CSP), a storage full signal (SFS), an alternate storage full signal (ASFS), a character ready pulse (CRP), an optional character ready pulse (OCRP), a print finished pulse (PFP) and character print outputs (CPO).

The character stored pulse is provided following the completion of the storage of each coded character and may be used with appropriate shaping as the next character load synch pulse. The characteristics of this pulse typically are as follows:

Amplitude: −6+0.5 volts into 1K ohm
Reference: ground
Rise time: 1 microsecond, maximum
Duration: 4 microseconds minimum, measured at 90% peak amplitude The full signal indicates the completion of the storage loading operation. It is a level change from −7 ±1 volts to 0 volts into 1K ohm impedance. This signal remains at 0 volts until the occurrence of a load synch pulse. An alternate storage full signal may be provided as a negative pulse of the characteristics given above in connection with the character stored pulse. The character ready pulse is provided at the completion of each memory scan. The characteristics of this pulse are the same as those of the charatcer stored pulse. An alternate character ready pulse may be provided an increase to −8±1 volt. The print finished pulse is generated after the scanning and printing of the last character corresponding to the printing mode selected. The characteristics of this pulse are the same as those of the charatcer stored pulse. The character print outputs are provided on 72 lines from 72 amplifier pulse stretcher circuits.

The following provisions are made for manual operation. Provision is made for charatcers to be manually selected one at a time and loaded into the storage for printing. Provision is made for a line to be printed under push button control, one character type at a time. This provision requires manual positioning of the print drum.

*Specific description*

The X and Y selection line drivers (XD and YD) 106 and 108 each includes a two phase shift register connected in a closed loop, each phase of which is energized by its own shift line. These shift regitsers are of the type described in the copending application of Robert D. Kodis and Sadia S. Guterman, Ser. No. 64,887, filed October 25, 1960, for Drive Circuit For Magnetic Core Memory. X drive 106 contains 22 stages and the Y driver 108 contains 14 stages. The first phase of each register is the unloaded phase and the second phase of each register is the load phase. The output of the unload drivers is of opposite polarity to that of the load drivers. Each of the X and Y drivers includes a magnetic core which must be set to ONE prior to the arrival of a shift pulse in order to generate an output. The ONE is propagated stage to stage, from the first phase to the second phase and back again to the first phase, thus energizing successive line drivers. Each line driver supplies one-half of the current necessary to set a memory core. Thus only a core at the intersection of driven X and Y lines is energized. The current output of a line driver besides operating the selection line also writes a ONE into the core of the driver of the next stage of opposite phase. As indicated above, the memory includes six digit frames, 11×7 or 77 cores. An auxiliary output memory including one additional core frame is provided. An addressed location is pulsed simultaneously in each of the seven digit planes by the outputs of the X and Y line drivers. In conventional fashion, since 11 and 7 are numbers without a common factor, energizing successive stages in both X and Y line drivers causes the memory cores to be processed in order. The arrangement is such that when the two drive lines activate location number 72, the next stage in each line drive is inhibited. In consequence, when location 72 is possessed, the ONE is erased from both line drivers and locations 73 thru 77 cannot be addressed. In order that the processing of the memory may be started anew, ONE'S have to be set into the first stages of both the X and Y drivers.

Figure 3:
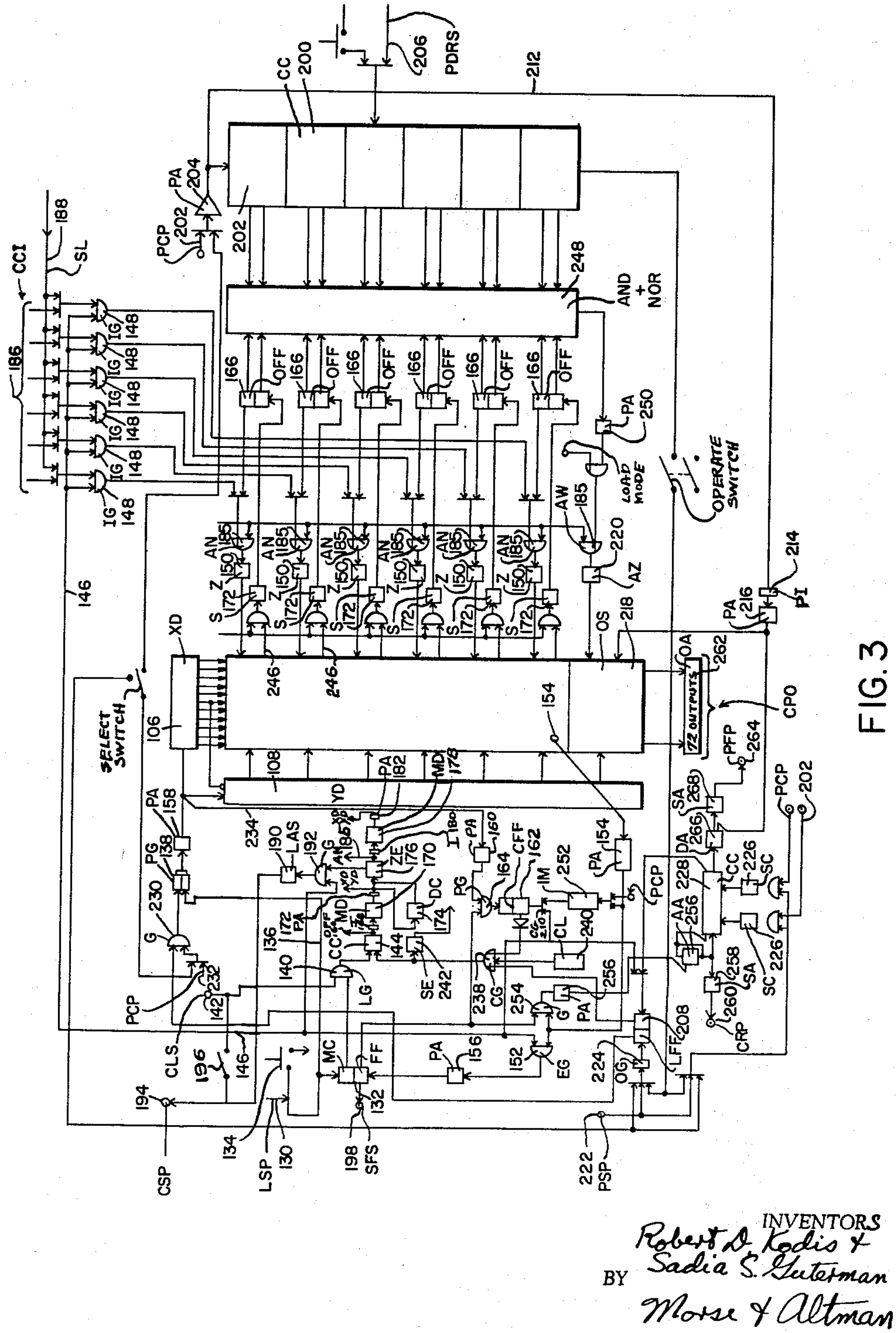
FIG. 3 is a detailed electronic and electromagnetic logic diagram of the system of FIG. 1.

With reference now to FIG. 3 the load synch pulse (LSP) is applied as at 130 under the control of a push button 134. The load synch pulse attacks a mode control flip-flop (MCFF) 132 switching it to its load mode condition. In addition to switching mode control flip-flop 132, load synch pulse 130 also sets ONE'S into X and Y line drivers 106 and 108 through a conductor 136 and a pulse gate (PG) 138. Mode control flip-flop 132 performs the following functions. It opens a load gate (LG) 140, which allows the character load synch pulse (CLS) 142 to pass and allows actuation of a clear circuit (CC) 144 in the form of a flip-flop reset. It also operates through a conductor 146 to open six input gates (IG) 148, through which the input information is applied to the inhibit drivers (Z) 150 of the memory. Finally, it opens an end gate (EG) 152 which can transmit a pulse from end marker core 154 and a pulse amplifier (PA) 154 in order to set mode control flip-flop to ONE through a pulse amplifier (PA) 156.

At this point, however, the gates controlled by the ONE side of mode control flip-flop 132 are closed. Note particularly that the output of a pulse amplifier (PA) 158, which is applied to a pulse amplifier (PA) 160, is unable to turn on a character flip-flop (CFF) 162 because a printing mode gate (PG) 164 is inoperative.

The loading sequence occurs as follows: Once the system has been set to the loading mode, the reception of character load synch pulse (CLS) 142 starts the memory cycle. One character load synch pulse (CLS) is supplied for each character to be loaded. Character load synch pulse 142 first actuates clear circuit (CC) 144, the output of which is sent directly to reset the output flip-flops (OFF) 166 of the memory and is passed through an inverter (I) 168 to trigger a master driver (MD) 170. Master driver 170 drives an associated power amplifier (PA) 172 which drives the unload phase of both the X and Y line drivers. In consequence, the corresponding memory address may be unloaded, with the memory cores being reset to ZERO. Under these circumstances, it will be noted that although information is being read out of the memory, its output flip-flops 166 are not set unless its sense amplifiers (S) 172 have been enabled. The output of power amplifier 172 is also passed through a delay circuit (DC) 174 and thence to a Z enable amplifier (ZE) 176. A write master driver (MD) 178 is energized by the output of Z enable amplifier 176 through an inverter (I) 180. Its output in turn drives a power amplifier (PA) 182, which drives the second phases of the X and Y line drivers. This action resets the cores in the memory to the ONE STATE if there is no inhibiting action by the Z drivers.

The main output of the Z enable amplifier (ZE) 176 is directed to six AND NOT gates (AN) 185 controlling Z inhibit drivers 150. With output flip-flops 166 in the ZERO state, the only other inputs that can affect the inhibit drivers 150 are received from the character code inputs (CCI) 186 by way of input gates (IG) 148. When a ONE (negative voltage) is present at a character code input line 186, the corresponding Z inhibit driver 150 through an AND NOT gate (AN) 185 is not allowed to operate. In consequence of the foregoing action and the action of the X and Y line drivers a ONE is set into the memory. If, however, a ZERO is present at the character code input 186, the Z driver is actuated. Its current is opposite in polarity and equal to the current of one of the line drivers so that no ONE is set into the memory, which remains at ZERO. A skip column signal (SL) 188 activates all six gates at once so that all six Z drivers may be disabled and the character 111111 stored.

The output from Z enable amplifier 176 also is directed to a lag amplifier shaper (LAS) 190 which, through an open gate (G) 192, delivers the character stored pulse (CSP) 194. For automatic loading in internal checking, this output can be used as the next character load synch pulse by closing toggle switch 196 for all 72 characters.

The end of the loading mode and change to the printing mode occurs as follows. When the 72nd character load synch pulse is applied, the last character is loaded into the 72nd address. At this time both X and Y line drivers lose their ONE'S and therefore are deenergized. Also at this time power amplifier 154 is caused to transmit a pulse through gate 152 held open by mode control flip-flop 132, then through a power amplifier (PA) 156 to switch mode control flip-flop 132 to the printing mode. Also, the storage full signal (SFS) 198 is set and the gates to be described below, which were held open in the loading mode by mode control flip-flop 132, now are closed. In particular the six character code inputs 186 now are closed so that, even if additional character code inputs are present, they have no effect.

The switching of mode control flip-flop 132 to the printing mode completes the loading operation. However, before proceeding to the description of the printing operation, it is necessary to describe the code counter (CC) 200 [far right] by means of which the selection of characters to be printed is made. Code counter 200 is a six stage static binary counter of conventional design fed by print character pulses (PCP) 202 from rotating print drum 116 (FIG. 1). These print character pulses actuate the first least significant stage 202 of counter 200 through a pulse amplifier (PA) 204. In its operating condition, code counter 200 indicates at all times the angular position of the print drum and this position corresponds to a specified coded character. In order to ensure that the counter does not get out of phase with the print drum, a print drum revolution synch pulse (PDRS) 206, which corresponds to coded character 000000 resets the counter to its ZERO condition once per print drum revolution.

The printing sequence occurs as follows. Mode control flip-flop 132 in the printing mode is no longer holding the character flip-flop 162 and an associated line flip-flop (LFF) 208 in reset condition. In addition, a character gate (CG) 210 at the other input of character flip-flop 162 is enabled so that the output of power amplifier 160 is able to switch character flip-flop 162 to its opposite condition. However, at this time, the arrival of a print character pulse, although causing the code counter 200 to be advanced one step, still produces no other effect. Although this pulse also actuates the read-out of an output storage 218 by way of a conductor 212, a pulse inverter (PI) 214 and a power amplifier (PA) 215 transistors, no output is produced. The reason for this is that during the loading operation, an auxiliary inhibit driver (AZ) 220 has never been prevented from operating, so that at this time output storage 218 is completely empty (loaded with ZERO's).

Print start pulse 222 is applied to line flip-flop 208 by way of an OR gate (OG) 224 in order to actuate line flip-flop 208. Optionally, through one of switch circuits (SC) 226, the print start pulse acts to preset a magnetic character counter (CC) 228, to a state controlled by a voltage level which selects either the all codes or the restricted codes printing mode. When line flip-flop 208 has been switched by the arrival of print start pulse 222 its output enables two gates. The first gate (G) 230 permits the print character pulse at 232 to actuate power amplifier (PA) 158 through pulse gate (PG) 138 for the purpose of loading ONE'S into the X and Y line drivers. The output of power amplifier 158 also is directed by way of conductor 234 and power amplifier 160 through gate 164 which is opened by the output of control flip-flop 132 through conductor 236. The second gate enabled by line flip-flop 208 is a clock gate (CG) 238 to permit a clock (CL) 240 to transmit through clock gate 238 a second pulse from character flip-flop 162 also must be applied.

Each print character pulse 202 initiates a complete memory scan. First it energizes the X and Y line drivers by the same path followed by load synch pulse 130 in the loading mode. In addition, however, the lagging edge of the output of power amplifier 158 switches character flip-flop 162 through lag amplifier 160. This action furnishes the second enable pulse to clock gate 238, thus transmitting pulses from clock 240. Clock 240 provides a 100 kc. pulse output which actuates the load and unload sequence. The clock output drives a sense enable (SE) 242. During each memory cycle the following events occur. When the storage is unloaded, the six outputs of the six sense lines 246, amplified by enable sense amplifiers 172, set the six output flip-flops 166 thereby moving the stored character from the main memory cores to output flip-flops 166. This coded character now stored in the output flip-flops 166, is immediately compared by means of a series of AND and NOR gates (AND & NOR) 248 with the coded character present at this time in code counter 200. If the two characters are like, the output of AND and NOR circuits 248, acting through a pulse amplifier (PA) 250 disables inhibit driver 220 of output storage 218.

In the printing mode character code inputs 186 are closed. Therefore the output flip-flops 166 control the six inhibit drivers 150 of the main storage. As a result, in the latter part of the memory cycle when the pulse from Z enable amplifier 176 and the pulse from character print output 262 are generated, the character stored in output flip-flops 166 is restored in the storage at its original address. At the same time, if the characters in output flip-flops 166 and code counter 202 were identical a ONE is loaded in output storage 218 at this address. Since clock 240 is a free running multivibrator, the memory cycles succeed each other until the clock is turned off. The operation here is similar to that which occurs in the loading mode at the 72nd location under the control of power amplifier 154. Here however the output is fed through an inverter-mixer (IM) 252 to reset character flip-flop 162 and stop clock 240. The output of marker amplifier 154 also is directed via a gate (G) 254 and a power amplifier (PA) 256, to activate an auxiliary amplifier (AA) 256 that produces a first output and a delayed second output. The first output adds a count to character counter 228 and the second output generates through a shaper amplifier (SA) 258 a character read pulse (CRP) 260. With clock 240 stopped, the memory is inactive until the arrival of a new print character pulse 202. When this is received, it activates power amplifier 216 by way of inverter 214. In consequence, output amplifiers (OA) 262 corresponding to addresses of output storage 218, in which ONE'S have been stored, actuate corresponding hammers 118 (FIG. 1). The preceding action is accomplished prior to the time when the print character pulse unblocks clock 240 and allows the latter to start the following memory scan. It will be understood that each print character pulse causes the printing of the character processed by the memory scan generated by the preceding print character pulse. Thus, for instance, a print character pulse causing "A" to be printed will place code counter 200 in a state corresponding to "B" and during this memory scan the presence of a coded "B" is investigated. This "B" then will be printed with the following print character pulse.

The end of the printing mode occurs as follows. As described above, all of each type of coded character are printed in succession as printing drum 116 rotates. The number of coded character types processed is counted by character counter 228 as explained previously. This counter is preset by print start pulse 222 to the count appropriate to the number of types of characters to be printed. For example, this counter is preset to 0 if the drum contains 64 coded characters. It is preset to 8 if the drum contains only 56 coded characters. If the restricted printing mode contains 16 coded characters, the character counter 228 is preset to 48. When the last coded character of the selected printing mode has been processed, character counter 228 carries. The resulting output resets line flip-flop 208, causing the second enable to be removed from clock gate 238 and turning off clock 240. In consequence further print character pulses 202 as they arrive are unable to initiate additional memory scans. The carry of character counter 228 not only acts to stop clock 240 but also to generate a print finished pulse (PFP) 264. In order to put print finished pulse 264 in synchronism with a print character pulse 202, the carry output loads a delay amplifier (DA) 266 which transmits when shifted by the output of power amplifier 216. The output of the delay amplifier 266 is applied to a shaper amplifier (SA) 268 whose output 264 is the print finished pulse. Since the main storage still holds the information originally loaded into it, a repetition of print start pulse 222 will cause the same line to be reprinted. In order to print a new line, load mode flip-flop 132 must be initiated and new information stored in the memory.

*Operation*

The cycle of operation of the present system involves the following five steps.

(1) Reset output flip-flops 166 to ZERO.

(2) Enable sense amplifiers 172.

(3) Activate X and Y line drivers of the appropriate address. Output flip-flops 166 are set if a ONE is unloaded from the corresponding core.

(4) Enable inhibit drivers 150. These are controlled by output flip-flops 166 in such a way that they are prevented from operating when a flip-flop is set to the ONE state.

(5) Activate character code inputs 186 to return information to appropriate addresses.

The first three steps above comprise the read part of the memory cycle, at the close of which the memory cores are left in the ZERO state. The two last steps form the load or restore part of the cycle, during which new information is loaded into the memory or old information is reloaded into it. The system operates in either a loading mode or in one or more printing modes. It is set to the loading mode by reception of the load synch pulse 130. Under these circumstances, input gates 148 are conditioned to accept input information and the X and Y drivers are energized. The 6 bits of each character are presented to input 186 in parallel on six lines as voltage levels. Reception of character load synch pulse 142 activates the memory cycle omitting the enabling of sense amplifiers 172. As a result, inhibit drivers 150 are controlled by input gates 185 rather than by output flip-flops 166 which can never be set without receiving the output of sense amplifiers 172. In order to load a ONE, any input gate 148 prevents its associated inhibit driver 150 from operating. If a ZERO is to be loaded, inhibit driver 150 is allowed to drive in opposition to the X and Y drivers, and therefore a ZERO is set into the memory. The loading can be accomplished at any rate up to 100 kc. and is controlled by character load synch pulses 142 which are generated externally. All 72 memory locations must be loaded. A special code can be assigned as column skip signal 188. This produces a space in the printed line at the appropriate address. When all addresses have been loaded, storage full signal 198 is emitted and the mode changes automatically from loading to printing. The change in mode causes input gates 148 to close so that memory cannot receive any additional character load synch pulses 142. The equipment now is dormant until print start pulse 222 is received.

Reception of the print start pulse 222 allows print character pulse 232 to apply the output of clock 240. This causes all 72 memory locations to be scanned. At the completion of the 72nd cycle, clock 240 is turned off and character ready signal 260 is generated. After this the equipment is dormant until the following print character pulse 232 is received. During the scanning process, the main storage is examined for the presence of characters identical with a specific character contained at that time in the code counter 200. When such identity is discovered, the information is recorded in corresponding locations of the output storage 218.

The reception of the next print character pulse 202 causes the following sequence.

(1) Output storage 218 is immediately unloaded and its outputs activate output amplifiers 262 to cause the printing of the particular character in the correct columns.

(2) Code counter 200 is moved one increment so that it now contains the next code character.

(3) Clock 240 is turned on and the main memory again is scanned for the presence of the next code character.

(4) The presence of the next code character is recorded in the appropriate locations of output storage 218.

A second counter, character counter 228, is employed to count the number of storage scans made. When all possible characters for a given mode have been printed, the line is finished. Character counter 228 carries and a print finish pulse 264 is generated. At the same time, further incoming print character pulses 202 are prevented. A new load synch pulse 130 may now initiate the loading of new information for the next line to be printed.

Repetition of print start pulse 222, however, causes the same line to be reprinted.

Information contained in the main storage need not be erased before new information is loaded in. In the process of loading new information, old information is unloaded but is not sensed and therefore is destroyed. When more than one printing mode is available, the choice between them is made by a voltage level accompanying print start pulse 222. The level should be present and stable at the time that print start pulse 222 is received. Furthermore, if a printing mode with a restricted number of characters is used, print start pulse 222 must arrive together with the print character pulse 202 corresponding to the first of those characters appearing on the print drum.

*Conclusion*

The present invention thus provides a simple, therefore inexpensive, technique by which the output of a serially operated memory may be applied in parallel for the purpose of actuating a printing mechanism. The components referred to in the above described system all are of well known design. Details of these components are fully disclosed in Meyerhoff, Barnes, Disson and Lund, "Digital Applications of Magnetic Devices," John Wiley & Sons, Inc., 1960, which specifies: the above described coincident current memory on page 374, FIG. 23.1; the above described pulse amplifiers and like components on page 458, FIG. 27.1 and page 197, FIG. 12.4; the above described comparator on page 165, FIG. 10.10; the above described counters at pages 166 and 167, FIGS. 10.2 and 10.13; and the above described AND components on page 165, FIG. 10.11.

Since certain changes may be made in the foregoing description and accompanying drawings without departing from the scope of the present invention, it is intended that all matter set forth herein be interpreted in an illustrative and not in a limiting sense.

What is claimed is:

1. A memory system comprising a group of arrays of magnetic cores, a series of first selection lines along which said cores of said group of arrays are arranged and with which said cores of said group of arrays communicate magnetically, a series of second selection lines along which said cores of said group of arrays are arranged and with which said cores of said group of arrays communicate magnetically, said first selection lines and said second selection lines being discrete electrically and being crossed geometrically, each of said cores being capable of assuming either of two alternate stable magnetic states, each of said cores being positioned at an intersection of one of said first selection lines and one of said second selection lines, a group of inhibit lines, one each of said inhibit lines being magnetically associated with one each of said arrays of cores, a group of sense lines, one each of said sense lines being magnetically associated with one each of said arrays of cores, means for sequentially driving said first selection lines, said second selection lines and said inhibit lines in order to load said cores of said group, means for producing a succession of group of first signals, means for sequentially driving said first selection lines, and said second selection lines in order to unload said cores of said group with said succession of groups of first signals on said sense line throughout a first predetermined cycle, an output unit including elements representing characters, means for operating said elements of said output unit corresponding to said first signals of said sequence, said last mentioned means operating throughout a second predetermined cycle having different parts, different ones of said characters being presented by said elements during different parts of said second predetermined cycle, said first predetermined cycle falling within each of said different parts of said second predetermined cycle, means synchronized with said output unit for producing a succession of groups of second signals, comparator means for actuating said output unit in the event that one of said first signals corresponds to one of said second signals, said output unit being a printing means including a rotatable drum presenting like characters in rows and unlike characters in columns, and a regenerative buffer memory interposed between said comparator means and said group of sense lines, said buffer memory being capable of producing a temporary record corresponding to said group of first signals and transmitting a group of signals to said comparator means and through said inhibit lines at the same time.

2. A memory system comprising a group of arrays of cores, a series of first selection lines along which said cores of said group of arrays are arranged and with which said cores of said group of arrays communicate magnetically, a series of second selection lines along which said cores of said group of arrays are arranged and with which said cores of said group of arrays communicate magnetically, said first selection lines and said second selection lines being discrete electrically and being crossed geometrically, each of said cores being capable of assuming either of two alternate stable magnetic states, each of said cores being positioned at an intersection of one of said first selection lines and one of said second selection lines, a group of inhibit lines, one each of said inhibit lines being magnetically associated with one each of said arrays of cores, a group of sense lines, one each of said sense lines being magnetically associated with one each of said arrays of cores, first scan means for sequentially driving said first selection lines, said second selection lines and said inhibit lines in order to load said cores of said group of arrays, second scan means for the sequential driving of said first selection lines and said second selection lines in order to unload said cores of said group of arrays such that a succession of groups of first signals are produced on said sense lines throughout a succession of first predetermined cycles, regenerative buffer means for receiving said succession of groups of first signals in succession to produce a succession of records corresponding thereto and for transmitting groups of second signals in succession corresponding thereto, print means for printing characters corresponding to said succession of groups of first signals in sequence, said print means operating throughout a second predetermined cycle, different ones of said characters being presented by said print means during different times of said second predetermined cycles, one each of said succession of groups of first signals in one each of said first predetermined cycles falling within one each of said different times of said second predetermined cycle, means synchronized with said print means for producing a succession of groups of third signals, and comparator means for actuating said print means in the event that selected ones of said second signals corresponds to selected ones of said third signals.

3. The memory system of claim 2 wherein said print means includes a rotating drum presenting characters in rows and columns.

4. The memory system of claim 2 wherein said print means includes a rotatable drum presenting like characters in rows and unlike characters in columns and a plurality of hammers disposed in a row along a line parallel to the axis of said rotatable drum.

References Cited by the Examiner

UNITED STATES PATENTS

| | | | |
|---|---|---|---|
| 2,905,930 | 9/59 | Golden | 340—172.5 |
| 2,915,967 | 12/59 | Gehring et al. | 101—93 |
| 2,941,188 | 6/60 | Flechtner et al. | 101—93 X |
| 2,957,163 | 10/60 | Kodis | 340—172.5 |
| 3,012,231 | 12/61 | Kent | 340—166 X |
| 3,024,723 | 3/62 | Wasserman | 101—93 |
| 3,064,561 | 11/62 | Mauduit | 101—93 |

WILLIAM B. PENN, *Primary Examiner.*

ROBERT A. LEIGHEY, *Examiner.*